E. RIVETT.
SELF CENTERING CHUCK.
APPLICATION FILED JUNE 21, 1912.
1,098,055.
Patented May 26, 1914.
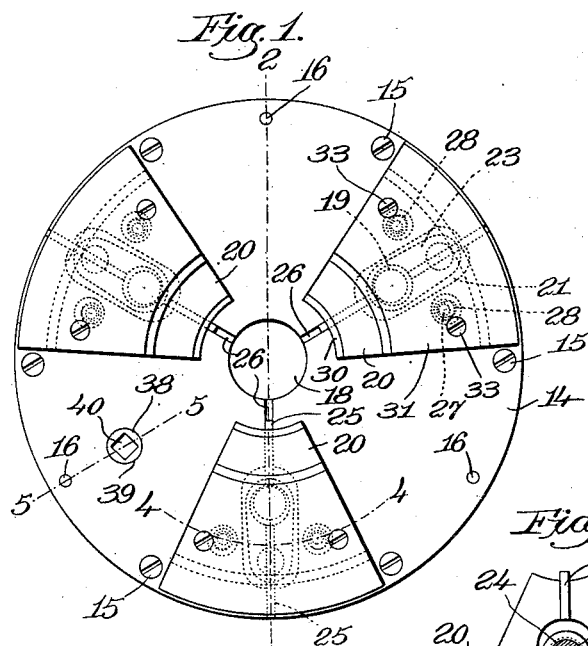
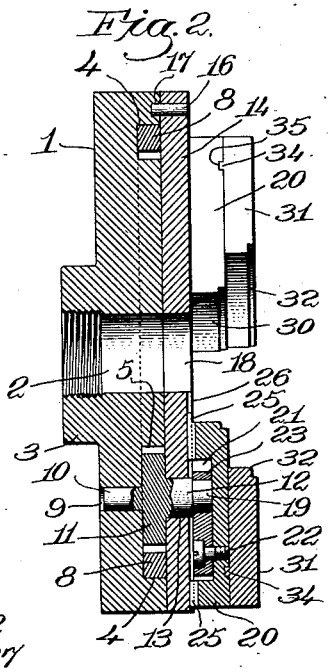
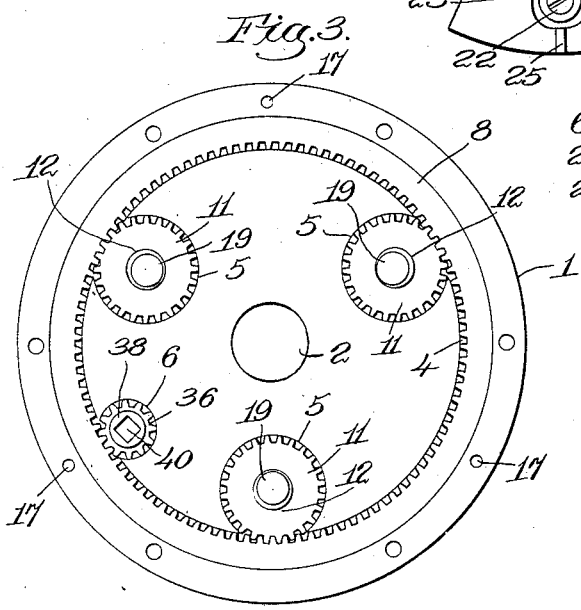
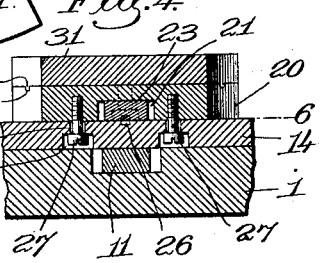
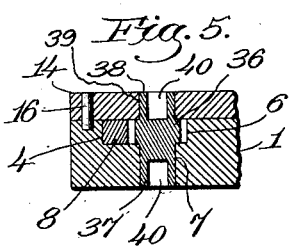
Witnesses:
Thomas J. Drummond
Warren O'Neil
Inventor.
Edward Rivett,
by Edwards Hard & Smith
Atty's.

UNITED STATES PATENT OFFICE.

EDWARD RIVETT, OF BRIGHTON, MASSACHUSETTS, ASSIGNOR TO RIVETT LATHE & GRINDER COMPANY, OF FANEUIL, MASSACHUSETTS, A CORPORATION OF MASSACHUSETTS.

SELF-CENTERING CHUCK.

1,098,055.       Specification of Letters Patent.       Patented May 26, 1914.

Application filed June 21, 1912. Serial No. 704,956.

*To all whom it may concern:*

Be it known that I, EDWARD RIVETT, a citizen of the United States, and resident of Brighton, county of Suffolk, State of Massachusetts, have invented an Improvement in Self-Centering Chucks, of which the following description, in connection with the accompanying drawing, is a specification, like characters on the drawing representing like parts.

This invention has for its object the production of a novel, strong and powerful self-centering chuck particularly adapted for holding bushings or other cylindrical objects for grinding or other manipulation, the construction of the chuck being such that the work is held rigidly and accurately. Herein the radially movable jaws are mounted on a heavy and strong chambered base, which is provided with suitable means for guiding and retaining the jaws in place thereon, the jaws being moved simultaneously toward or from the axial center of the chuck.

I have provided a simple, powerful and quick-acting means for effecting the equal and simultaneous movement of the jaws, and such means is wholly inclosed, partly within the chambered base and partly within the jaws, thereby preventing the entrance of dust, grit, or other foreign matter which would tend to undue wear of parts or to an improper action of the chuck. The closing of the jaws to clamp the work centers the same, and the radial movement of the jaws is limited positively by the actuating means, and the actuating means is also self locking, so that when the jaws are set up to securely grasp and clamp the work they are held in clamped position without further attention on the part of the operator. The actuating means for the jaws can be operated from the back of the chuck or from the face thereof, as may be most convenient, and without the expenditure of any considerable force by the operator.

The various novel features of my invention will be fully described in the subjoined specification and particularly pointed out in the following claims.

Figure 1 is a face view of a chuck embodying one practical form of my present invention, with the jaws at their extreme innermost position; Fig. 2 is a diametrical section thereof on the line 2—2, Fig. 1, the section being taken through one of the jaws and showing the manner in which the jaw actuating means is concealed and inclosed in the base and jaws of the chuck; Fig. 3 is a face view of the base, the cover or face plate thereof being removed, showing the chambering of the base and that portion of the jaw actuating means which is seated therein; Fig. 4 is a sectional detail taken on the curved line 4—4, Fig. 1, looking outward from the center of the chuck; Fig. 5 is a sectional detail on the line 5—5, Fig. 1, to show the manner of operating the jaw actuating means from the face or the back of the chuck; Fig. 6 is a rear view and part section of one of the jaws, taken on the line 6—6, Fig. 4.

In the present embodiment of my invention the chuck base 1 is in practice a heavy and rigid metal disk, centrally apertured at 2 and having at its back an internally threaded, concentric hub 3 for the attachment of the chuck to the spindle of the grinding machine or other apparatus with which the chuck is to be used. All of the working parts of the chuck are mounted upon the base, which provides a firm and unyielding support therefor.

Herein I have illustrated a three-jaw chuck, but it will be understood from the detailed description that I am not limited to any particular number of jaws.

The front side of the base is recessed or chambered to present a main annular chamber 4 concentric with the axis of the chuck and of relatively large radius, and a plurality of equi-distant, circular and like auxiliary chambers 5, Fig. 3, which intersect the inner wall of the main chamber, and there are as many of the auxiliary chambers as there are jaws. A smaller auxiliary chamber 6 also intersects the main chamber 4, the chamber 6 being also circular, and it has a central hole 7 which extends through the base 1 to the back thereof, as shown in Fig. 5. An internally toothed annular or ring gear 8 is rotatably seated in the main chamber 4 and is supported by the outer wall and bottom of said chamber, the gear thus having an external bearing provided for it by the base.

Each of the auxiliary chambers 5 has a central hole 9 extended through the base, as shown in Fig. 2, to form an outer bearing for the journal 10 of a pinion 11 rotatably seated in the corresponding chamber 5, the pinion meshing with the teeth of the gear 8 at the intersection of the main and auxiliary chambers, as shown in Fig. 3. Each of said pinions 11 has projecting from its opposite or inner face a journal 12, of larger diameter than the journal 10, as herein shown, but coaxial therewith, the journals 12 of the several pinions having bearing in holes 13 in a circular face plate 14 fixedly secured to the base 1 by suitable screws 15, Fig. 1.

The face plate is provided with pins 16 which enter sockets 17 in the base, Fig. 3, which pins serve to position the face plate on the base and also assist the fastening screws 15 in securing the parts firmly together. A central aperture 18 in the face plate registers with the aperture 2 of the base. By reference to Fig. 1 it will be seen that the pins 16 are located between each two jaws, and that the attaching screws 15 are arranged in pairs and are located adjacent each jaw. The face plate is a strong and rigid metal disk, and fits tightly upon the base of the chuck, to close the chambered portion thereof and prevent the entrance of any foreign matter thereinto, and as will be more clearly understood hereinafter the bearings 13 are protected by the jaws of the chuck.

The end of each pinion journal 12 extended beyond the face plate is reduced in diameter and made eccentric to the pinion axis, as at 19, the eccentrics of the several pinions 11 having the same throw and being set symmetrically, as is clearly shown in Fig. 3. That is, rotative movement of the gear 8 will impart to all of the pinions 11 simultaneous and equal rotation, in the same direction, and the several eccentrics 19 will be moved angularly through equal arcs and toward or from the axis of the chuck.

Each jaw 20 is made as a solid metal block, segmental in plan view, having an elongated recess 21 in its underside, in which is pivoted at 22 a link 23, said link having its free inner end apertured at 24, Fig. 6, to embrace an eccentric 19, and a fin or rib 25 is provided on the bottom of the jaw, running lengthwise of the jaw and central thereof, the rib being interrupted by the recess 21. The bottom of the jaw rests squarely upon the face plate 14 and the rib 25 enters a radial guide-way 26 in the plate, and by reference to Fig. 1 it will be seen that three of these guideways are shown, 120° apart. The coöperating guideway and rib of each jaw serves to prevent any lateral movement of the jaw, and confines the movement of the latter to a positive and precise radial movement toward or from the axis of the chuck, such movement being effected by rotation of the eccentric 19, transmitted to the jaw near its outer end, and at its bottom by the link 23. It is of course necessary to maintain the jaw seated on the face plate, and this is effected by headed downhold screws 27, best shown in Fig. 4, which project from the bottom of the jaw and pass loosely through slots 28 in the face plate, the slots being counterbored at 29 to receive the heads of said screws. The slots are long enough to permit the extreme radial movement of the jaw, and the screw heads slide upon the bottoms of the counterbored portions 29 when the jaw is moved, but the jaw is securely and positively held to its seat upon the face plate.

From the foregoing description it will be apparent that all of the jaws will be moved simultaneously and equally toward or from the axis of the chuck when the several eccentrics 19 are rotated, through rotative movement of the gear 8 and the intervening connections, the lateral swing of the links 23 preventing any cramping or binding at such time.

Any suitable lubricant can be applied to the actuating gearing, in the chamber of the chuck base, and in the recesses 21, and inasmuch as the face plate completely covers the gearing, while the links are inclosed between the jaws and the face plate, such lubricant will last for a long time. Furthermore, the actuating means for the jaws being altogether inclosed, the entrance of dirt, grit, abrading material, or other foreign matter is effectually prevented and wear is reduced to a minimum.

Each jaw has at its inner end a circularly curved and preferably stepped seat 30 to engage the work to be held by the chuck, the stepping of the seat making it convenient to handle work of different diameters. To increase the capacity of the chuck in this respect I prefer to provide each jaw with an auxiliary seat, and to this end I mount on each jaw a segmental plate 31 having at its inner end a circularly curved and stepped seat 32.

The plate 31 is secured to the jaw by screws 33, and to accurately position said plate so that its seat must always be truly concentric to the chuck axis I provide the plate with a circularly curved rib 34 which seats in a correspondingly curved groove 35 in the top of the jaw.

It will be understood that while I have shown the seats of the jaw and the plate thereon as each presenting two concentric stepped surfaces, and of different diameters, the same is merely for purposes of illustration, for the stepping can be increased or diminished as may be desired. For a great range of work, however, it will be found that the provision of four work holding seats for each jaw, as herein shown, will be ample.

It will be noticed that the guide rib 25 on each jaw projects somewhat beyond the inner end of the jaw, and this is to prevent grit from working in beneath the jaw through the guideway 26.

The gear 8 is, obviously, the actuating member of the means for effecting the opening and closing movements of the jaws, and from the foregoing description it will be apparent that the extent of radial movement of the jaws depends upon the angular movement of the several eccentrics 19 due to rotative movement of said actuating member 8. Consequently, when said member is revolved the intervening connections between it and the jaws effect the opening or closing movement of the jaws in a positive, rapid, and powerful manner, and the jaws will be locked in closed position by the eccentrics 19.

As the jaws are moved simultaneously and equally they are always equi-distant from the axis of the chuck and thereby are self-centering with respect to the work to be held. The maximum travel of the jaws is not great, obviously, and a slight rotative movement of the actuating member 8 in either direction from the position shown in Fig. 3 will open the jaws, to their full extent, a continued rotation of said member closing the jaws. This closing movement of the jaws, is, however, positively limited, as will be manifest, so that any crushing or deformation of the work is prevented, the range of jaw movement being sufficient only to permit the easy insertion and removal of the work when the jaws are opened, and to securely and rigidly grasp the work without crushing when the jaws are closed.

The direction of rotation of the member 8 is not material, as will be obvious, and as the eccentrics 19 have a short throw or leverage the jaws can be set up with a strong and powerful movement but with a relatively small expenditure of energy on the part of the operator.

As the power exerted by the actuating means upon the jaws is transmitted thereto substantially along the median line of each jaw and in a plane near and parallel to the bottom thereof it is unnecessary to provide a very deep or wide radial guideway in the face plate, for the reception of the rib on the jaw, for there is practically nothing acting upon the jaw in a direction transverse to its proper path of movement.

I have herein shown convenient primary means for rotating the actuating member 8, the same consisting of a pinion 36 meshing with said member and seated in the auxiliary chamber 6 of the chuck base, said pinion having its oppositely extended journals 37, 38, Fig. 5, rotatably mounted in bearing holes in the base and face plate, respectively, the journal 37 entering the hole 7 heretofore referred to and the journal 38 entering the coaxial hole 39 in the face plate. Each journal has a square or other polygonal socket 40 therein, for the reception of a suitable key, by which the operator can rotate the pinion 36 and thereby effect the operation of the jaw actuating means, from the face or the back of the chuck, as may be most convenient. The journals of the primary operating pinion 36 come flush with the surfaces of the chuck base and face plate, and fit accurately in their bearings in such parts, so that practically no foreign matter can enter the base chamber at that part of the chuck.

The chuck as a whole is neat and workmanlike in appearance, and the entire jaw actuating means is concealed from view and is thoroughly protected.

Changes or modifications in various details of construction and arrangement may be made by those skilled in the art without departing from the spirit and scope of my invention as set forth in the claims hereunto annexed.

Having fully described my invention, what I claim as new and desire to secure by Letters Patent is:

1. In a chuck, a chambered base having an attached face plate provided with a plurality of radial guideways, jaws slidable on the face plate toward and from the axial center of the chuck and each provided with a rib coöperating with one of the guideways, means to maintain each jaw seated while permitting radial movement thereof upon the face plate, and actuating means coöperating with the jaws to effect positive simultaneous and equal movement thereof toward and from the center of the chuck, said actuating means including an actuating member rotatably mounted in the chambered base, and individual connections between said member and each of the jaws.

2. In a chuck, a rotatable base, a plurality of jaws carried thereby and movable radially toward and from the center of rotation of the chuck, means to prevent other movements of the jaws relatively to the base, concealed actuating means for and operatively connected with the jaws, to effect positive simultaneous and equal opening and closing movement thereof, and a primary operating member for said means, accessible at the back and the face of the chuck.

3. In a chuck, a rotatable base, a plurality of jaws carried thereby and movable radially toward and from the center of rotation of the chuck, means to prevent other movements of the jaws relative to the base and concealed actuating means for the jaws including rotatable eccentrics connected to the jaws to control the radial position of said jaws and means to operate said eccentrics in unison.

4. In a chuck, a rotatable base having an annular chamber and a plurality of auxiliary circular chambers intersecting said annular chamber, an internally toothed actuating gear rotatably seated in the latter, pinions rotatably seated in the circular chambers and meshing with said gear, an apertured face plate attached to the base and covering the gearing, each pinion having a journal extended through the face plate and provided with an eccentric end, a plurality of jaws mounted upon the face plate and movable radially thereon toward and from the axis of the chuck, each jaw having a recessed bottom, a link in each recess and pivotally connected at its outer end with the jaw, the inner end of the link having an aperture to receive the eccentric on the corresponding pinion journal, rotation of the pinions acting through said eccentrics and links to effect radial movement of the several jaws simultaneously and equally toward or from the axis of the chuck, and an externally accessible and manually operated device to effect rotative movement of the annular actuating gear.

5. In a chuck, a rotatable, chambered base having an attached face plate, a plurality of jaws slidably mounted thereon, coöperating means on said plate and the jaws to guide the latter in radial paths toward and from the axis of the chuck, and actuating means operatively connected with the jaws to effect positive simultaneous and equal opening and closing movement of the jaws, a portion of said means being seated in the chambered base and inclosed by the face plate, a portion of said means extending through the face plate and connected to said jaws.

6. In a chuck, a rotatable, rigid base having a concentric annular chamber and a plurality of equi-distant auxiliary chambers communicating with the inner wall thereof, an internally toothed actuating gear rotatably seated in the annular chamber, pinions rotatably seated in the auxiliary chambers and meshing with said gear, each pinion having an attached eccentric, a face plate covering the chambered portion of the base and apertured to expose the eccentrics, a plurality of jaws permanently connected with and slidable radially on said face plate, links connecting the jaws and said eccentrics, to effect opening and closing movement of the jaws by rotative movement of the pinions, and a manually operated device to rotate the annular gear.

7. The combination with a rotatable, chambered chuck base, and an attached face plate covering the chamber and provided with a plurality of radial, equi-distant guideways, of a plurality of jaws slidably mounted on the face plate and coöperating with the guideways, to restrict the jaws to radial movement only, self-locking jaw actuating means including a rotatable toothed actuating member and coöperating eccentrics geared thereto, seated in the chambered base, and direct, positive connections between said eccentrics and the jaws, to impart equal and simultaneous movement to the jaws toward and from the axial center of the chuck.

8. The combination, in a chuck, of a circular base having an attached face plate provided with equi-distant radial guideways, jaws coöperating with the guideways and slidably mounted on the face plate, means to connect the jaws and face plate while permitting radial movement of the former, each jaw having a recessed bottom, and jaw actuating means including members inclosed between the base and the face plate and other connecting members between the recessed bottoms of the jaws and the face plate, said means effecting radial movement of the jaws simultaneously and equally toward and from the axis of the chuck.

9. The combination, in chuck, of a chambered base, and an attached face plate provided with equi-distant apertures, rotatable pinions seated in the chambered base and having each an eccentric projecting through an aperture in the face plate, an annular gear in the base chamber meshing with and to rotate the pinions and said eccentrics, a plurality of jaws slidably mounted on the face plate, a substantially radial link connecting each jaw and an eccentric, whereby rotation of the latter effects positive radial movement of the jaw, means to maintain the jaws seated on the face plate, and externally accessible means to effect manual rotation of the annular gear.

10. In a chuck, an annularly chambered rotatable base having an attached face plate, a plurality of symmetrically disposed jaws slidably mounted on the face plate, and means to guide the jaws in radial paths of movement and means including controlling members one pivotally connected to each jaw at its radial axis and an actuating member rotatably mounted in the annular chamber of the base to effect positive and equal movement of the controlling members thereby controlling the radial movement of the jaws toward and from the axis of the chuck.

11. In a chuck, a base, a plurality of radially movable jaws supported thereby, a plate attached to the top of each jaw and having at its inner end a work-engaging seat, a circularly curved groove in one of said parts and a coöperating corresponding curved rib on the other part to properly position the plate on the jaw and means to effect equal and positive radial movement of the jaws toward and from the axis of the chuck.

12. In a self-centering chuck, in combination, a rotatable base having a face plate provided with radial guideways, jaws coöperating with the guideways, and slidably mounted on the face plate toward and from the center of the chuck, each jaw having a longitudinally recessed bottom, and means to effect movement of the jaws simultaneously and equally toward and from the axis of the chuck, said means including a member pivotally connected with each jaw near its outer end and within the recess thereof, said members moving in a plane parallel to the face plate.

13. In a self-centering chuck, in combination, a rotatable base having a face plate provided with radial guideways, jaws coöperating with the guideways and slidably mounted on the face plate toward and from the center of the chuck, each jaw having a longitudinally recessed bottom, and means to effect movement of the jaws simultaneously and equally toward and from the axis of the chuck, said means including a series of eccentrics rotatably mounted in the base in parallelism with the axis of the chuck and projecting beyond the face plate into the recesses of the jaws, and a link in each recess, apertured at one end to embrace the eccentric and at its opposite end pivotally connected with the jaw.

14. In a self-centering chuck, in combination, a rotatable base having a face plate provided with radial guideways, jaws coöperating with the guideways and slidably mounted on the face plate toward and from the center of the chuck, each jaw having a longitudinally recessed bottom, and means to effect movement of the jaws simultaneously and equally toward and from the axis of the chuck, said means including a series of eccentrics rotatably mounted in the base in parallelism with the axis of the chuck and projecting beyond the face plate into the recesses of the jaws, a positive connection between each eccentric and the adjacent jaw, to move the latter radially by rotative movement of the eccentric, and an actuating member coöperating with all of the eccentrics to impart equal and simultaneous angular movement thereto.

15. In a self-centering chuck, in combination, a rotatable base having a face plate provided with radial guideways, jaws coöperating with the guideways and slidably mounted on the face plate toward and from the center of the chuck, and means to effect movement of the jaws simultaneously and equally toward and from the axis of the chuck, said means including a series of eccentrics rotatably mounted in the base in parallelism with the axis thereof and positively connected with the jaws near their outer ends and adjacent the bottoms thereof.

16. In a self-centering chuck, in combination, a rotatable base provided with radial guideways, a plurality of jaws coöperating with the guideways and slidable toward and from the axis of the chuck, and positively connected with the base, and self-locking actuating means to effect simultaneous and equal radial movement of the jaws, said means including a link connected to each jaw and acting substantially along the median line thereof.

17. In a self-centering chuck, in combination, a rotatable base provided with radial guideways, a plurality of jaws coöperating with the guideways and slidable toward and from the axis of the chuck, means to positively connect said jaws and the base while permitting radial movement of the former, and self-locking actuating means to effect simultaneous and equal radial movement of the jaws, said means including a rotatable eccentric positively connected with each jaw, and an instrumentality to effect equal and simultaneous angular movement of the eccentrics.

18. In a chuck, a rotatable base, a plurality of jaws carried thereby and movable radially toward and from the center of rotation of the chuck, means to restrict the jaws to radial movement only, self-locking jaw-connecting means including a rotatable toothed actuating member and coöperating eccentrics geared thereto seated in the chambered base and direct positive connections between said eccentrics and the jaws, to impart equal and simultaneous movement to the jaws toward and from the center of the chuck.

In testimony whereof, I have signed my name to this specification, in the presence of two subscribing witnesses.

EDWARD RIVETT.

Witnesses:
　JOHN C. EDWARDS,
　BESSIE G. MORRIS.

---

Copies of this patent may be obtained for five cents each, by addressing the "Commissioner of Patents, Washington, D. C."